United States Patent
Tian (10) Patent No.: US 11,932,415 B2
(45) Date of Patent: Mar. 19, 2024

(54) DATA MONITORING METHOD AND MEDIUM

(71) Applicant: Autoflight (Kunshan) Co., Ltd., Kunshan (CN)

(72) Inventor: Yu Tian, Hong Kong SAR (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/180,110

(22) Filed: Mar. 7, 2023

(65) Prior Publication Data
US 2023/0278722 A1    Sep. 7, 2023

(30) Foreign Application Priority Data
Mar. 7, 2022    (CN) .......................... 202210215456.4

(51) Int. Cl.
*B64D 45/00*    (2006.01)
(52) U.S. Cl.
CPC ...... *B64D 45/00* (2013.01); *B64D 2045/0085* (2013.01)

(58) Field of Classification Search
CPC .................. B64D 45/00; B64D 2045/0085
See application file for complete search history.

(56) References Cited

U.S. PATENT DOCUMENTS

| | | | |
|---|---|---|---|
| 2018/0053358 A1* | 2/2018 | Hale | B64F 5/60 |
| 2022/0252014 A1* | 8/2022 | Kumar | B64D 31/06 |
| 2023/0184166 A1* | 6/2023 | Hamzehi | G05B 23/0259 |
| | | | 701/29.5 |

\* cited by examiner

*Primary Examiner* — Shon G Foley
(74) *Attorney, Agent, or Firm* — WPAT LAW, P.C.; Anthony King (57) ABSTRACT

A data monitoring method and a data monitoring medium. The method has: acquiring current vibration data of a target flight device in real time; Determining an anomaly protection strategy of the target flight device based on the current vibration data; The target flight equipment is controlled to execute corresponding operations according to an abnormality protection strategy. Embodiments of the invention, by acquiring the current vibration data of the target flight equipment in real time, determining an anomaly protection strategy of the target flight device based on the current vibration data.

12 Claims, 5 Drawing Sheets

DATA MONITORING METHOD AND MEDIUM

FIELD OF THE DISCLOSURE

The present disclosure relates to the technical field of monitoring, especially relates to a data monitoring method, a system, a device and a medium.

BACKGROUND OF THE INVENTION

In the existing technology, all kinds of flight device, especially vibration of unmanned aerial vehicle is less than the system capable of real-time detection, the existing avionics system lacks real-time monitoring of the vibration amount, when the structure damage or motor blade work is abnormal, or the aircraft dynamic balance is bad, the whole vibration will be very serious, light further damage structure, the weight caused control system abnormal work, even body disassembly, on a certain degree to influence the safety of the flight device.

SUMMARY OF THE INVENTION

In view of the above, the present invention provides a data monitoring method, a system, a device and a medium, capable of real time monitoring the real-time vibration condition of each distribution point of the flight device, improving the safety of the flight device.

In a first aspect, an embodiment of the present invention provides a data monitoring method, the method comprising:
  acquiring the current vibration data of the target flying device in real time;
  determining the abnormal protection strategy of the target flight device according to the current vibration data;
  controlling the target flight device to execute the corresponding operation according to the abnormal protection policy.

In a second aspect, the embodiment of the invention further provides a data monitoring system, the system comprising:
  a vibration sensor, a health monitoring system, and a flight control system wherein the vibration sensor respectively a connection with the health monitoring system and the flight control system the health monitoring system is connected with the flight control system;
  real-time collecting the current vibration data of the target flight device through the vibration sensor, and directly sending the current vibration data to the flight control system to the health detection system, so that the flight control system according to the current vibration data to determine the abnormal protection strategy of the target flight device, and controlling the target flight device to perform the corresponding operation according to the abnormal protection policy.

In a third aspect, the embodiment of the invention further claims a flight device, the flight device comprising: the data monitoring system described in the second aspect; at least one processor; and
  a memory in communication connection with the at least one processor; wherein,
  the memory is stored with a computer program executable by the at least one processor, the computer program is executed by the at least one processor, so that the at least one processor is capable of executing the data monitoring method of the first aspect.

a fourth aspect, a computer readable storage medium the computer readable storage medium stored with computer instructions, the computer instructions are used for causing the processor to implement the data monitoring method according to the first aspect.

The technical solution of the embodiment of the invention, by real-time obtaining the current vibration data of the target flight device; determining the abnormal protection strategy of the target flying device according to the current vibration data; controlling the target flight device to execute the corresponding operation according to the abnormal protection policy. The embodiment of the invention obtains the current vibration data of the target flight device by real time, according to the current vibration data, determining the abnormal protection strategy of the target flight device, according to the abnormal protection strategy, controlling the target flight device to perform the corresponding operation, it can real-time monitor the real-time vibration condition of each distribution point of the flight device, so as to monitor the vibration condition of the whole machine in real time, when the vibration is abnormal, the first time alarm, which improves the safety of the flight device to a certain degree, so as to reduce the time and cost, and improve the efficiency.

DETAILED DESCRIPTION

The present invention will be further described in detail with reference to the accompanying drawings and examples. It is to be understood that the specific embodiments described herein are only used to explain the present invention, but not to limit the present invention. In addition, it should be noted that, for ease of description, only a portion associated with the present invention is shown in the attached drawings rather than all of the structures.

It should be mentioned before the exemplary embodiments are discussed in more detail, some exemplary embodiments are described as processing or method depicted as a flowchart. Although the flowchart is to describe various operations (or steps) in order, many of the operations may be implemented in parallel, concurrently or simultaneously. In addition, the order of each operation can be rearranged. When the operation is completed, the processing may be terminated, but may also have an additional step not included in the drawings. The processing may correspond to a method, a function, a procedure, a subroutine, a subroutine, and the like. In addition, in the case of no conflict, the embodiments of the present invention and the features in the embodiments can be combined with each other.

The term "including" and its deformation used in the present invention are open including, but not limited to, "including but not limited to." The term "based on" is "at least partially based on." The term "one embodiment" refers to "at least one embodiment."

It should be noted that: Similar labels and letters represent like items in the following drawings, and therefore, once a certain item is defined in one of the drawings, it is not necessary to further define and interpret it in the following drawings. At the same time, in the description of the present invention, the term "first," "second" and so on only for distinguishing description, but not to be understood as indicating or hinting relative importance.

Figure 1:
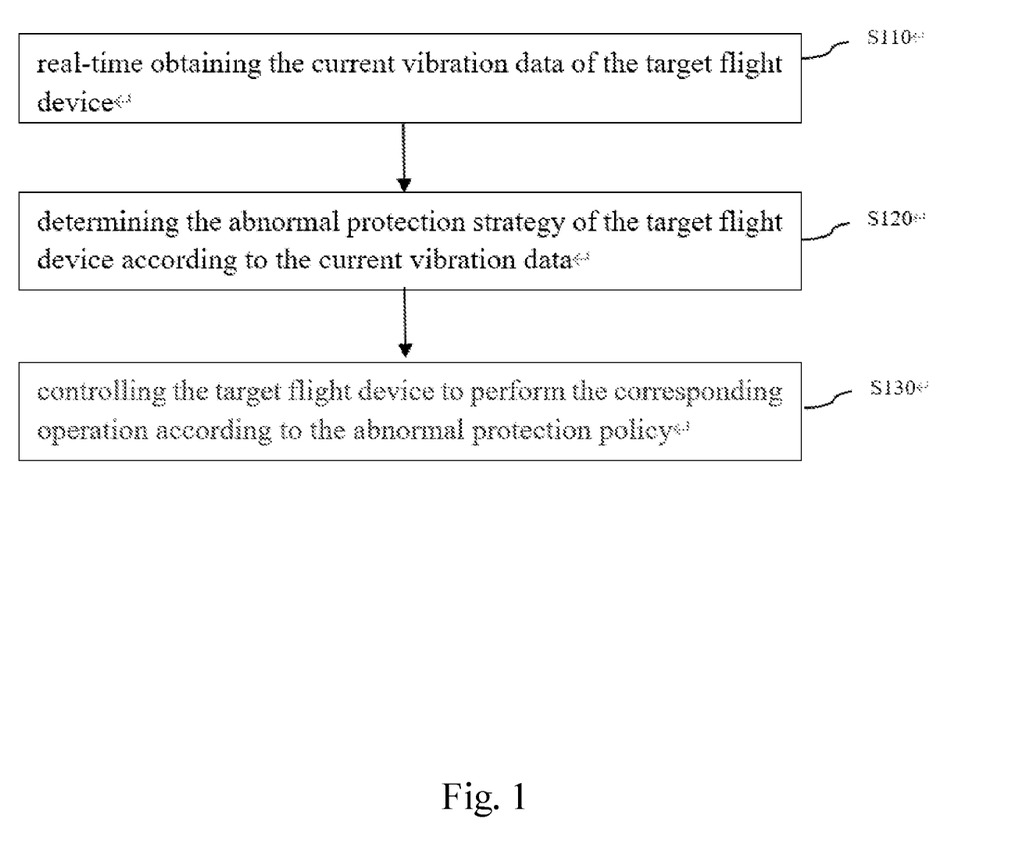
FIG. 1 is a flow chart of a data monitoring method provided by an embodiment of the present invention.

In one embodiment, FIG. 1 is a flow chart of a data monitoring method provided by the embodiment of the invention, the embodiment is suitable for the data to monitor the condition. The embodiment can be executed by a flight device. wherein the flight device can be unmanned aerial vehicle or human-machine and other flying device. As shown in FIG. 1, the present embodiment may include the following steps:

S110, real-time obtaining the current vibration data of the target flight device.

Wherein the target flight device can be unmanned aerial vehicle, human-machine, air force fighter aircraft and other flight device. the current vibration data can be understood as the obtained real-time current vibration data collected by each mounting vibration sensor position in the target flying device, for example, it can be vibration amount, also can be vibration frequency, also can be vibration phase, the embodiment is not limited. wherein the vibration data of the flight device is an important parameter needed to be monitored by the flight device, when there is abnormal vibration, it can timely alarm detection and maintenance direct relation to the safety of the flight device. It should be noted that the current vibration data of the target flight device may be caused by many reasons, such as structure fatigue, structure damage, blade damage, motor or engine working abnormality and so on. In one embodiment, the current vibration data comprises vibration amount, vibration frequency and vibration phase parameter, for the necessary part at the same time for monitoring each parameter, so as to avoid possible false alarm. In another embodiment, the current vibration data collecting the original data, the obtained digital signal for time domain and frequency domain processing, so as to improve the precision of the data sampling.

In this embodiment, the current vibration data of the target flight device can be obtained in real time. Specifically, it can receive the current vibration data of the target flight device from the vibration sensor in real time, or can also receive the current vibration data sent by the monitoring system of the target flight device in real time from the vibration sensor. It should be noted that each vibration collecting point in the target flight device is distributed on each part of the aircraft according to need, each part according to the current vibration data of the sampling target flight device, namely each vibration collecting position is configured with a vibration sensor, example, the mounting position of the motor engine is configured with a vibration sensor; a vibration sensor is arranged at the mounting position of the wing; the navigation system mounting position is also configured with a vibration sensor, sampling the current vibration data of the target flight device according to the requirement.

In one embodiment, each necessary part of the target flight device is configured with a vibration sensor;

Wherein, the necessary part at least comprises: a motor engine mounting position; installing position of navigation system; a steering engine mounting position; a wing mounting position; and a vertical tail mounting position.

In this embodiment, each necessary part of the target flight device is configured with a vibration sensor. The vibration sensor can be a digital acceleration sensor, installed on each necessary part of the target flight device, for sampling the vibration data of the target flight device, using a digital acceleration sensor, more convenient for digital processing and quantitative analysis. Wherein, the necessary part at least comprises: a motor engine mounting position; installing position of navigation system; a steering engine mounting position; a wing mounting position; and a vertical tail mounting position. In some embodiments, the each position respectively installed with digital acceleration sensor, to monitor the vibration data of each position, the vibration data for each position is set safety the threshold range, and giving different position different risk weight proportion, such as motor engine 40%, navigation system 20%, steering engine 20%, wing 10%, vertical tail 10%, of course also can be other weight ratio, when the vibration data of a certain mounting position exceeds the corresponding threshold range, monitoring system will perform weight calculation and performing quantization early warning, so as to prompt the risk degree of the current flight device, and prompting the maximum flight according to the quantization early warning, so as to find the nearest forced landing route.

In this embodiment, the target flight device also comprises a non-necessary position: landing gear, the airborne device comprises a flight instrument, a communication device and so on. Specifically, the vibration sensor can be integrated in the motor, control system can be integrated in the steering engine, control system can be independently configured, the embodiment is not limited.

It should be noted that, can according to the structure of the target flight device, the necessary part configured vibration sensor for a certain adjustment, when the target flight device structure in necessary part is increased, the number of the vibration sensor is increased. In this embodiment, each necessary part of the target flight device is configured with a vibration sensor, a plurality of necessary parts can simultaneously perform multi-point sampling vibration data, can according to the vibration data is abnormal, prompting the user to the corresponding check of important part. exemplary, the target flight device in each mounting vibration sensor part, the real-time collected current vibration data, can be fed back to the health monitoring system and flight control system in the avionics system by collecting bus, flight control system can according to the vibration condition of each necessary position in the target flight device, to make the corresponding protection strategy. wherein the health monitoring system is used for checking the running performance of each part of the target flight device according to the received current vibration data. it can be understood that the analysis of the current vibration data by the health monitoring system, namely determining the operation performance of each part, to obtain the abnormal part, and feeding back to the flight control system, so that the flight control coefficient to the abnormal part executing the corresponding protection strategy. in the actual operation process, the health monitoring system can obtain the current vibration condition of the target flight device in real time, including but not limited to, the current vibration condition of each motor engine mounting position, the current vibration condition of the flight control navigation system mounting position, the current vibration condition of the steering engine mounting position, the current vibration condition of the mounting position of the wing and the current vibration condition of the mounting position of the vertical tail. In the embodiment, directly analyzing the current vibration data through the health monitoring system, so as to obtain the abnormal part, so that the flight control system uses the protection strategy to deal in time, reduces the data calculation amount of the flight control system, also indirectly improves the data calculation speed, and improves the processing efficiency of the abnormality.

In one embodiment, the configuration mode of the vibration sensor, comprising one of the following: integrated on the motor control system it is integrated on the steering engine control system independently configured.

In this embodiment, the configuration mode of the vibration sensor can be a plurality of vibration sensor can be integrated on the motor control system also can be integrated on the steering control system, also can be independently configured.

S120, determining the abnormal protection strategy of the target flight device according to the current vibration data.

Wherein the abnormal protection strategy can be understood as the current state of the target flight device judged by the current vibration data, and according to the state of the corresponding protection strategy. the abnormal protection strategy can be the fault voice prompt; it also can be used for overhauling the fault part; it also can be used for closing the fault part; This embodiment is not limited in this embodiment. It should be noted that according to the current vibration data determined by the target flight device of the current fault degree and the current fault position, determining the abnormal protection strategy of the target flight device.

In this embodiment, can according to the current vibration data, to determine the abnormal protection strategy of the target flight device. Specifically, it can set the preset vibration threshold value, according to the current vibration data and the preset vibration threshold value of the correlation comparison, to determine the current fault degree and the current fault position of the target flight device, and according to the current fault degree and the current fault position, determining the target flight device corresponding to the abnormal protection policy. wherein the current fault degree can be light fault, it can be severe fault; the current fault position can be the necessary position of the target flight, for example, it can be motor engine mounting position and so on; it also can be the non-necessary position of the target flight device, for example, can be the sound box on the aircraft and so on.

S130, controlling the target flight device to perform the corresponding operation according to the abnormal protection policy.

In this implementation, according to the current vibration data to determine the abnormal protection strategy of the target flight device, it can according to the abnormal protection strategy of the target flight device, to control the target flight device to perform the corresponding operation. exemplary, when the current vibration data judges that the target flight device current state is the light fault state, and is the non-necessary position of the target flight position, it can give the fault voice prompt, the target flight position of the fault position for a certain temporary check, to process with a certain measure to check the fault, if it cannot be removed, the airplane device stops the flight component replacement and so on; when the current vibration data judges that the current state of the target flight device is the severe fault state of the necessary position, the abnormal protection strategy of the target flight device can be set to control the aircraft emergency force drop and close the current fault part.

The technical solution of the embodiment of the invention, by real-time obtaining the current vibration data of the target flight device; determining the abnormal protection strategy of the target flying device according to the current vibration data; controlling the target flight device to execute the corresponding operation according to the abnormal protection policy. The embodiment of the invention obtains the current vibration data of the target flight device by real time, according to the current vibration data, determining the abnormal protection strategy of the target flight device, according to the abnormal protection strategy, controlling the target flight device to perform the corresponding operation, it can real-time monitor the real-time vibration condition of each distribution point of the flight device, so as to monitor the vibration condition of the whole machine in real time, when the vibration is abnormal, the first time alarm, which improves the safety of the flight device to a certain degree, so as to reduce the time and cost, and improve the efficiency.

Figure 2:
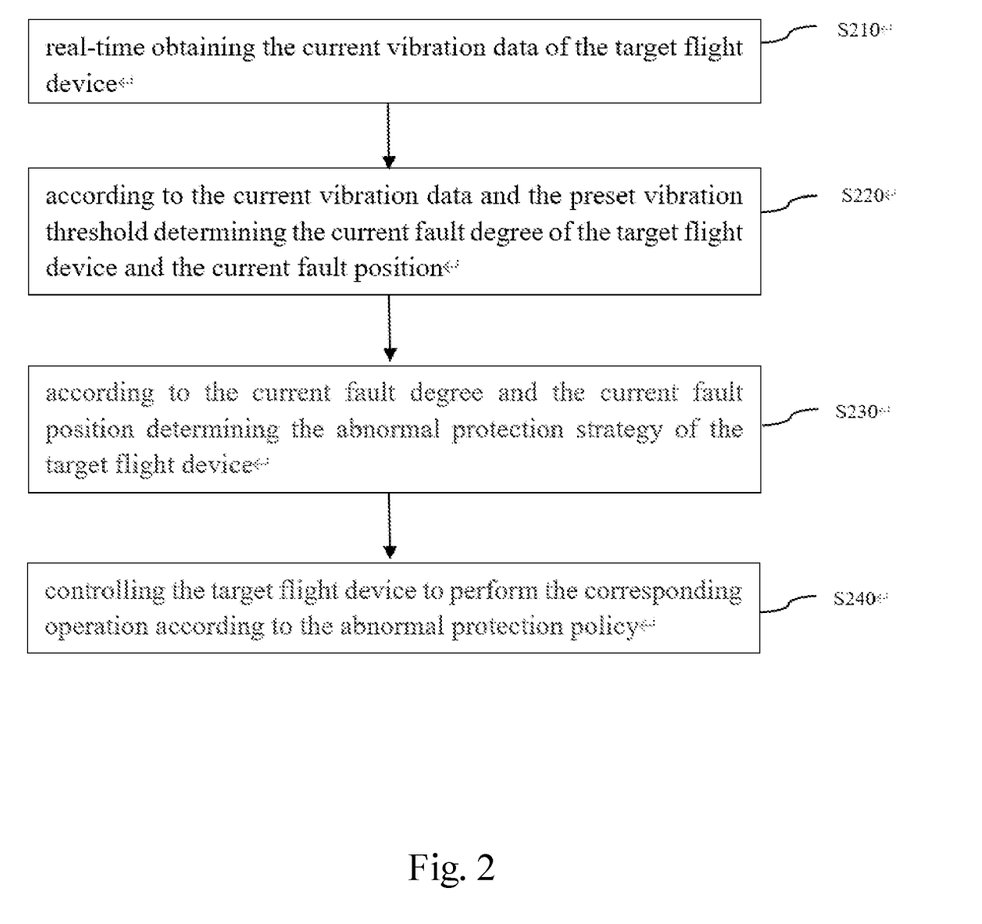
FIG. 2 is a flow chart of another data monitoring method provided by the embodiment of the present invention.

In one embodiment, FIG. 2 is a flow chart of another data monitoring method provided by the embodiment of the invention, the embodiment based on each of the above embodiments, the current vibration data of real-time obtaining target flight device and according to the current vibration data to determine the target flight device of the abnormal protection strategy, further refining. As shown in FIG. 2, the data monitoring method in this embodiment may specifically comprise the following steps:

S210, real-time obtaining the current vibration data of the target flight device.

In one embodiment, S210 may include two implementation modes: Firstly, receiving the current vibration data sent by the vibration sensor in real time; second, receiving the current vibration data sent by the vibration sensor through the health monitoring system in real time.

Under the condition of using the first implementation, the current vibration data of each part in the target flight device sent by each vibration sensor can be received in real time from the position of each mounting vibration sensor in the target flight device, according to the sent current vibration data, determining the corresponding abnormal protection strategy.

Under the condition of using the second realizing mode, because the target flight device is provided with a plurality of vibration sensors, can receive the vibration sensor of each part, the current vibration data of each mounting vibration sensor part sent by the health monitoring system in real time, can according to the sent current vibration data, to determine the corresponding abnormal protection policy.

S220, according to the current vibration data and the preset vibration threshold determining the current fault degree of the target flight device and the current fault position.

Wherein the preset vibration threshold value can be understood as the correlation threshold value of the preset vibration data. It should be noted that the preset vibration threshold value may include a first preset vibration threshold value and the second preset vibration threshold value, and the first preset vibration threshold value is less than the second preset vibration threshold value. It should be noted that, when the current vibration data using different parameters, the preset vibration threshold is not the same. Exemplary, when the current vibration data is vibration amount, the corresponding preset vibration threshold value is vibration amount threshold value; under the condition that the current vibration data is vibration phase, the corresponding preset vibration threshold value is vibration phase threshold value.

In this embodiment, the current fault degree can be understood as the target flight device, the vibration sensor of each part according to the current vibration data and the preset vibration threshold value, the current fault degree of the determined target flight device. the current fault degree can be the current is mild fault, also can be the current is severe fault, can be determined according to the current vibration data and the preset vibration threshold value.

In this embodiment, the current fault position can be understood as the target flight device in the current position of the fault part. the current fault position can be any one position of the target flight device, can be the necessary position of the target flight device, also can be the non-necessary position of the target flight device, the embodiment is not limited.

In this embodiment, according to the related threshold of the current vibration data and the preset vibration data, for example, can be, the first preset vibration threshold value and the second preset vibration threshold value, to determine the current fault degree of the target flight device and the current fault position. Specifically, according to each necessary position in the target flight device, the installed vibration sensor for collecting each current vibration data and the first preset vibration threshold value and the second preset vibration threshold value of the comparison result, judging the target flight device in each position of the current fault degree of light weight, can according to the light weight of the current fault degree and the current fault position, determining the corresponding abnormal protection strategy of the target flight device, and according to the different abnormal protection strategy, making different reaction operations.

In one embodiment, the preset vibration threshold comprises: a first preset vibration threshold value and a second preset vibration threshold value, and the first preset vibration threshold value is less than the second preset vibration threshold value;

according to the current vibration data and the preset vibration threshold determining the current fault degree of the target flight device and the current fault position, comprising:

respectively the comparison result of the current vibration data and the first preset vibration threshold value and the second preset vibration threshold value; under the condition that the current vibration data is greater than the first preset vibration threshold and less than the second preset vibration threshold value, the current fault degree of the target flight device is mild fault; under the condition that the current vibration data is greater than the second preset vibration threshold value, the current fault degree of the target flight device is severe fault; determining the current fault position of the target flight device according to the mounting position of the vibration sensor corresponding to the current vibration data greater than the preset vibration threshold.

Wherein the preset vibration threshold comprises: a first preset vibration threshold value and a second preset vibration threshold value, and the first preset vibration threshold value is less than the second preset vibration threshold value. The purpose of setting the first preset vibration threshold value and the second preset vibration threshold value is used for detecting the fault degree.

In this embodiment, it can respectively the comparison result of the current vibration data with the first preset vibration threshold value and the second preset vibration threshold value, when the current vibration data is greater than the first preset vibration threshold value and less than the second preset vibration threshold value, at this time, it can be considered that the current fault degree of the target flight device is mild fault, when the current vibration data is greater than the second preset vibration threshold value, the current fault degree of the target flight device is severe fault, according to the current vibration data is greater than the preset vibration threshold value corresponding to the vibration sensor mounting position, so as to determine the current fault position of the target flight device. Exemplary, the current vibration data is greater than the preset vibration threshold corresponding to the vibration sensor mounting position is the motor engine mounting position, then the current fault position of the target flight device is the motor engine mounting position, and according to the fault degree at this time, to perform the corresponding abnormal protection strategy.

S230, according to the current fault degree and the current fault position determining the abnormal protection strategy of the target flight device.

In this embodiment, for different current fault degree and the current fault position, the specified target aircraft abnormal protection strategy is different.

In this embodiment, according to the comparison result of the current vibration data and the first preset vibration threshold value and the second preset vibration threshold value, determining the current fault degree of the target flight device and the current fault position, according to the current fault degree and the current fault position, to determine the abnormal protection strategy corresponding to the target flight device. Specifically, if the current fault is a mild fault, and the current fault position is a non-necessary position, the abnormal protection strategy of the target flight device as fault voice prompt; the current fault degree is mild fault, and the current fault position is the necessary position, the abnormal protection strategy of the target flight device is set as the maintenance fault part; the current fault degree is severe fault, and the current fault position is the necessary position, the abnormal protection strategy of the target flight device is set to close the fault part.

In one embodiment, according to the current fault degree and the current fault position determining the abnormal protection strategy of the target flight device, comprising one of the following:

When the current fault degree is mild fault, and the current fault position is the non-necessary position, determining the abnormal protection strategy of the target flight device is fault voice prompt; when the current fault degree is mild fault, and the current fault position is the necessary position, determining the abnormal protection strategy of the target flight device as maintenance fault part; when the current fault degree is severe fault, and the current fault position is the necessary position, determining the abnormal protection strategy of the target flight device is closing the fault part.

Wherein the mild fault can be understood as the target flight device will not generate a great influence of the fault, can be not affecting the target flight device normal flight of the fault. The severe fault can be understood as a fault that has a great impact on the target flight device. the fault voice prompt can be understood as the current fault is mild fault, and the non-necessary position of the target flight device fault occurs, the operation of voice prompt of the fault occurs, can be in the form of voice broadcast. repairing the fault part can be understood as the current fault degree is mild fault, and the current fault position is the necessary position of the target flight device, the related operation of the fault to overhaul. closing the fault part can be understood as the current fault degree is severe fault, and the current fault position is the necessary position of the target flight device, the fault occurs to close the operation of the fault part.

In this embodiment, the current fault degree is mild fault, and the current fault position is the non-necessary position, can be the abnormal protection strategy of the target flight device is determined as a fault voice prompt; when the current fault degree is mild fault, and the current fault position is the necessary position, the abnormal protection strategy of the target flight device can be determined as maintenance fault part; when the current fault degree is severe fault, and the current fault position is the necessary position, the abnormal protection strategy of the target flight device can be determined to close the fault part.

S240, controlling the target flight device to perform the corresponding operation according to the abnormal protection policy.

The technical solution of the embodiment of the invention, by receiving the current vibration data sent by the vibration sensor in real time; or receiving the current vibration data sent by the vibration sensor through the health monitoring system in real time, then determining the current fault degree and the current fault position of the target flight device according to the current vibration data and the preset vibration threshold, determining the abnormal protection strategy of the target flight device according to the current fault degree and the current fault position.

The embodiment of the invention, by receiving the current vibration data sent by the vibration sensor in real time; or receiving the current vibration data sent by the vibration sensor through the health monitoring system in real time, determining the current fault degree and the current fault position of the target flight device according to the current vibration data and the preset vibration threshold, determining the abnormal protection strategy of the target flight device according to the current fault degree and the current fault position, further realizing the real-time monitoring real-time vibration condition of each distribution point of the flight device, so as to real time monitoring the vibration condition of the whole machine when there is vibration abnormal, the first time alarm, improves the safety of the flight device, reduces the time and cost, improves the efficiency.

Figure 3:
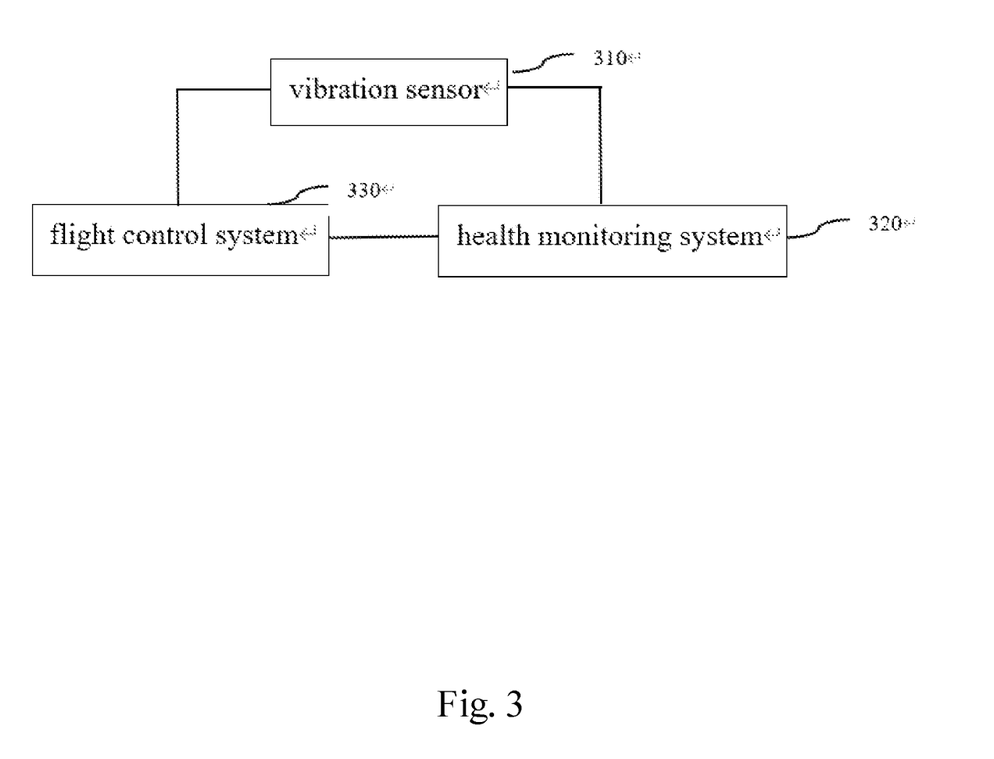
FIG. 3 is a structural block diagram of a data monitoring system provided by an embodiment of the present invention.

In one embodiment, FIG. 3 is a structural block diagram of a data monitoring system to an embodiment of the present invention, the system is suitable for the data to monitor the condition, the system can be realized by hardware/software. It can be configured in the flight device to realize a data monitoring method in the embodiment of the invention. As shown in FIG. 3, the system comprises:

vibration sensor 310, health monitoring system 320 and flight control system 330, wherein the vibration sensor 310 respectively a connection with the health monitoring system 320 and the flight control system 330; the health monitoring system 320 with the flight control system establishing connection;

collecting the current vibration data of the target flight device by the vibration sensor 310 in real time, and directly sending the current vibration data to the flight control system the flight 330 through the health detection system 320. so that the flight control system 330 according to the vibration data to determine the abnormal protection strategy of the target flight device, and according to the abnormal protection strategy control the target flight device to perform the corresponding operation.

The system of the embodiment of the present invention, through the vibration sensor 310 respectively health monitoring system 320 and flight 330 control system connection; health monitoring system 320 with the flight 330 control system connection through the vibration sensor 310 real-time collecting the current vibration data of the target flight device, and through the health detection system 320 or directly sending the current vibration data to the flight control system 330. to make the flight control system 330 according to the current vibration data to determine the abnormal protection strategy of the target flight device, and according to the abnormal protection strategy control target flight device to perform the corresponding operation, can real time monitoring the real-time vibration condition of each distribution point of the flight device, when there is vibration abnormal, the first time alarm, The safety of the flying device is improved to a certain extent.

It should be noted that the current vibration data of the target flight device using the flight control system at the same time, it also can through the ground monitoring system real-time monitoring the vibration condition of the whole machine.

The data can monitoring system data monitoring method provided by any embodiment of the invention, comprising performing data monitoring method corresponding to the function module and beneficial effect.

Figure 4:
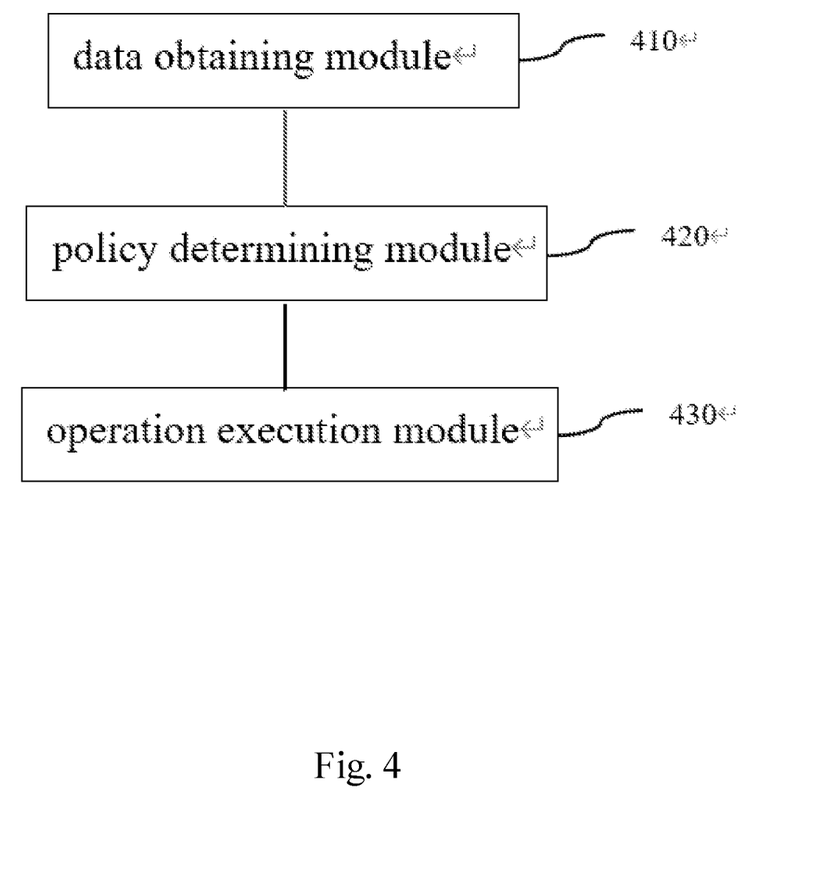
FIG. 4 is a structure diagram of a data monitoring device provided by the embodiment of the present invention.

In one embodiment, FIG. 4 is a structure schematic diagram of a data monitoring device provided by the embodiment of the present invention. A data monitoring device provided by this embodiment can be realized by software and/or hardware, which can be configured in the server to realize a data monitoring method in the embodiment of the invention. As shown in FIG. 4, the device may specifically include: a data acquisition module 410, a policy determination module 420, and an operation execution module 430.

Wherein the data obtaining module 410, for real-time obtaining the current vibration data of the target flight device;

a policy determining module 420, used for according to the current vibration data to determine the target flight device of the abnormal protection policy;

an operation execution module 430, used for according to the abnormal protection policy control the target flight device to perform the corresponding operation.

The technical solution of the embodiment of the invention, through the data obtaining module, real-time obtaining the current vibration data of the target flight device; a strategy determining module, determining the abnormal protection strategy of the target flight device according to the current vibration data; an operation execution module, controlling the target flight device to perform the corresponding operation according to the abnormal protection policy. The embodiment of the invention obtains the current vibration data of the target flight device by real time, according to the current vibration data, determining the abnormal protection strategy of the target flight device, according to the abnormal protection strategy, controlling the target flight device to perform the corresponding operation, it can real-time monitor the real-time vibration condition of each distribution point of the flight device, so as to monitor the vibration condition of the whole machine in real time, when the vibration is abnormal, the first time alarm, which improves the safety of the flight device to a certain degree, so as to reduce the time and cost, and improve the efficiency.

In one embodiment, the data obtaining module 410, comprising:
- a first data receiving unit, for receiving the current vibration data sent by the vibration sensor in real time;
- a second data receiving unit, used for or receiving the current vibration data sent by the vibration sensor through the health monitoring system in real time.

In one embodiment, the policy determining module 420 comprises:
- a fault determining unit for determining the current fault degree and the current fault position of the target flight device according to the current vibration data and the preset vibration threshold;
- a strategy determining unit, for determining the abnormal protection strategy of the target flight device according to the current fault degree and the current fault position.

In one embodiment, the preset vibration threshold comprises: a first preset vibration threshold value and a second preset vibration threshold value, and the first preset vibration threshold value is less than the second preset vibration threshold value;

The fault determination unit includes:
- a result comparison sub-unit, for respectively the comparison result of the current vibration data with the first preset vibration threshold value and the second preset vibration threshold value;
- mild fault determining sub-unit, for the current vibration data is greater than the first preset vibration threshold value and less than the second preset vibration threshold value, the current fault degree of the target flight device is mild fault;
- severe fault determining sub-unit, used for the current vibration data is greater than the second preset vibration threshold value, the current fault degree of the target flight device is severe fault;
- a fault position determining sub-unit, for determining the current fault position of the target flight device according to the mounting position of the vibration sensor corresponding to the current vibration data greater than the preset vibration threshold.

In one embodiment, the policy determining unit comprises one of the following:
- the first policy determining sub-unit, used for the current fault degree is mild fault, and the current fault position is the non-necessary position, determining the abnormal protection policy of the target flight device is a fault voice prompt;
- the second policy determining sub-unit, for the current fault degree is mild fault, and the current fault position is the necessary position, determining the abnormal protection strategy of the target flight device is maintenance fault part;
- the third policy determining sub-unit, for the current fault degree is severe fault, and the current fault position is the necessary position, determining the abnormal protection strategy of the target flight device is closing the fault part.

In one embodiment, each necessary part of the target flight device is configured with a vibration sensor;

Wherein, the necessary part at least comprises: a motor engine mounting position; installing position of navigation system; a steering engine mounting position; a wing mounting position; and a vertical tail mounting position.

In one embodiment, the configuration mode of the vibration sensor, comprising one of the following: integrated on the motor control system it is integrated on the steering engine control system independently configured.

The data monitoring device can perform data monitoring method provided by any embodiment of the invention, comprising performing data monitoring method corresponding to the function module and beneficial effect.

Figure 5:
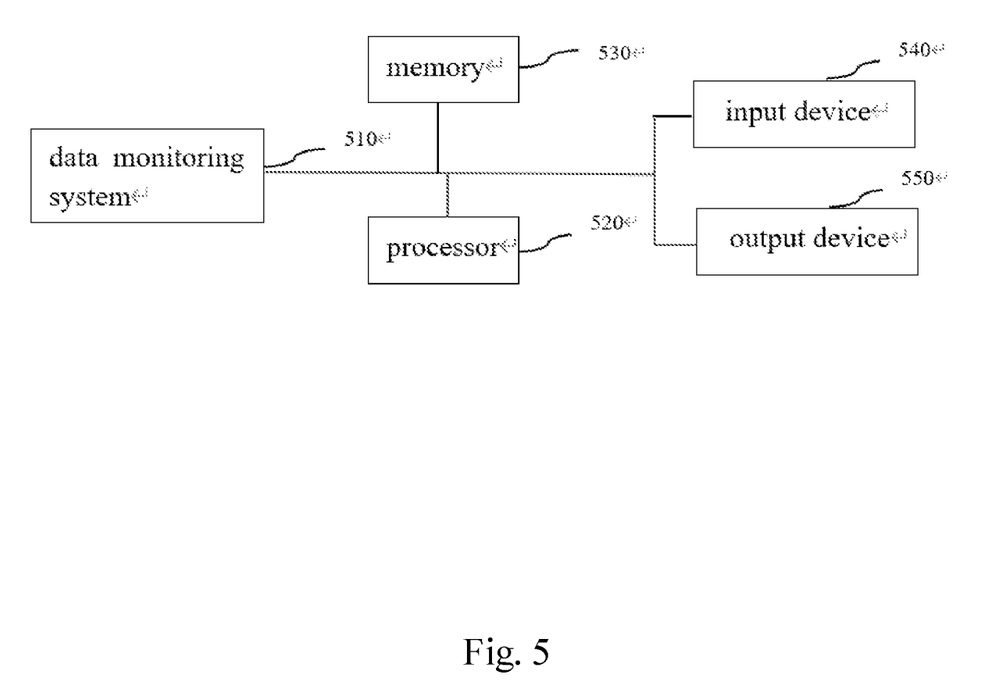
FIG. 5 is a hardware structure schematic diagram of a flight device provided by the embodiment of the present invention.

In one embodiment, FIG. 5 is a hardware structure schematic diagram of a flight device provided by the embodiment of the invention. The device in the embodiment of the present invention is described by taking a computer as an example. As shown in FIG. 5, an embodiment of the invention Claims a flight device, comprising: Data monitoring system 510, processor 520, memory 530, input device 540, and output device 550. processor 520 in the flight device may be one or more, in FIG. 5 by a processor 520 for example, the processor 520 in the flight device, memory 530, input device 540 and output device 550 can be connected by a bus or other way, FIG. 5 is connected by a bus as an example.

The memory 530 in the flight device as a computer readable storage medium can be used for storing one or more programs, program can software program, computer executable program and module, according to the embodiment of the invention or the provided data monitoring method corresponding to the program instruction/module (e.g., data monitoring device shown in FIG. 4 comprises: a data acquisition module 410, a policy determination module 420, an operation execution module 430). processor 520 by operation stored in the memory 530 of the software program, instructions and module, so as to perform various kinds of function application and data processing of the cloud server, namely realizing the method in the method embodiment data monitoring method.

The memory 530 may include a storage program area and a storage data area, wherein the storage program area is capable of storing the operating system, at least one of the application program required for function The storage data area can store the data created according to the use of the device. In addition, the memory 530 may include a high speed random access memory, further may include a non-volatile memory, such as at least one disk memory device, flash memory device, or other non-volatile solid state memory device. In some examples, the memory 530 may further include a memory remotely located relative to the processor 520, the remote memory can be through network connection device. Examples of the network include, but are not limited to, Internet, enterprise intranet, local area network, mobile communication network, and combinations thereof.

The input device 540 may be used to receive the number or character information by the user to generate a key signal input associated with the user setting and the function control of the terminal device. The output device 550 may include a display device such as a display screen.

When the flight device comprises one or more programs are executed by one or more processors 50, the program performs the following operations: acquiring the current vibration data of the target flying device in real time; determining the abnormal protection strategy of the target flight device according to the current vibration data; controlling the target flight device to execute the corresponding operation according to the abnormal protection policy.

The embodiment of the invention further Claims a computer readable storage medium which is stored with a computer program, the program is executed by a processor to realize the data monitoring method provided by the embodiment of the invention, the method comprises: acquiring the current vibration data of the target flying device in real time; determining the abnormal protection strategy of the target flight device according to the current vibration data; controlling the target flight device to execute the corresponding operation according to the abnormal protection policy.

The computer storage medium the embodiment of the present invention may be any combination of one or more computer-readable media. The computer readable medium may be a computer readable signal medium or a computer readable storage medium The computer can readable storage medium, for example, but not limited to electricity, magnetic, light, electromagnetic, infrared, or a semiconductor system, device or device, or any combination of the above. A more specific example of computer readable storage medium (non-exhaustive list) includes: electrically connected with one or more leads, a portable computer disk, a hard disk, a random access memory (Random Access Memory, RAM), a read-only memory (Read-Only Memory, ROM), erasable programmable read only memory (Erasable Programmable ROM, EPROM or flash memory), optical fiber, portable compact disk read-only memory (Compact Disc Read-Only Memory, CD-ROM), a light storage device, a magnetic memory device, or any suitable combination thereof. In the present document, the computer readable storage medium be any tangible medium containing or storing program, the program can be executed by the instruction execution system, device or device or used in combination with it.

The computer-readable signal medium may include a data signal that propagates in the baseband or as part of the carrier, wherein the computer-readable program code is carried. Such a propagated data signal may be in a variety of forms, including but not limited to electromagnetic signals, optical signals, or any suitable combination of the foregoing. The computer readable signal medium may also be any computer readable medium other than the computer readable storage medium the computer readable medium may be transmitted, transmitted or transmitted for execution by the instruction system, device or device or a program for use in combination with it.

The program code embodied on a computer readable medium may be transmitted with any suitable medium, including, but not limited to, wireless, wire, optical cable, RF, etc., or any suitable combination of the foregoing.

It can be one or more program design language or a combination thereof to write a computer program code for executing the operation of the invention, the program design language comprises a program design language facing the object, such as Java, Smalltalk, C++, further comprising a conventional process program design language, such as "C" language or similar program design language. The program code can be completely executed on the user computer, partially executed on the user computer, as an independent software package execution, part of the user computer is partially executed on the remote computer, or is completely executed on the remote computer or server. In the case of a remote computer, the remote computer may be connected to a user computer by any kind of network, including a local area network (LAN) or a wide area network (WAN), or may be connected to an external computer (e.g., by Internet connection) using an Internet Service Provider.

Note that the above is only a preferred embodiment of the present invention and the technical principles employed. It will be understood by those skilled in the art that the present invention is not limited to the particular embodiments herein and is capable of various obvious variations, readjustments and substitutions by those skilled in the art without departing from the scope of protection of the present invention. It will be understood that the invention is not limited to the particular embodiments herein, but can be varied, readjusted and substituted without departing from the scope of protection of the invention. Thus, although the invention is described in some detail by the above embodiments The present invention is not limited to the above embodiments, but can include more equivalent embodiments without departing from the concept of the present invention. The scope of the present invention is determined by the scope of the appended claims.

What is claimed is:

1. A data monitoring method comprising:
    acquiring a current vibration data of a target flight device in real time;
    determining an abnormal protection strategy of the target flight device according to the current vibration data;
    controlling the target flight device to execute a corresponding operation according to the abnormal protection policy; and
    wherein each necessary part of the target flight device is configured with a vibration sensor;
    wherein the necessary part comprises a motor engine mounting position, installing position of a navigation system, a steering engine mounting position, a wing mounting position, and a vertical tail mounting position.

2. The method according to claim 1, wherein the step of acquiring the current vibration data of the target flight device in real time comprises:
    receiving the current vibration data sent by the vibration sensor in real time; or
    receiving the current vibration data sent by the vibration sensor through a health monitoring system in real time.

3. The method according to claim 1, wherein the step of determining the abnormal protection strategy of the target flight device according to the current vibration data comprises:
    determining a current fault degree and a current fault position of the target flight device according to the current vibration data and a preset vibration threshold; and
    determining the abnormal protection strategy of the target flight device according to the current fault degree and the current fault position.

4. The method according to claim 3, wherein the preset vibration threshold comprises:
    a first preset vibration threshold value and a second preset vibration threshold value, and the first preset vibration threshold value is less than the second preset vibration threshold value;
    according to the current vibration data and the preset vibration threshold to determine the current fault degree and the current fault position of the target flight device, comprising respectively comparing a result of the current vibration data with the first preset vibration threshold value and the second preset vibration threshold value;
    under the condition that the current vibration data is greater than the first preset vibration threshold and less than the second preset vibration threshold value, the current fault degree of the target flight device is mild fault;

under the condition that the current vibration data is greater than the second preset vibration threshold value, the current fault degree of the target flight device is severe fault;

determining the current fault position of the target flight device according to the mounting position of the vibration sensor corresponding to the current vibration data greater than the preset vibration threshold value.

5. The method according to claim 3, wherein the step of determining the abnormal protection strategy of the target flight device according to the current fault degree and the current fault position comprises one of the following:

when the current fault degree is mild fault, and the current fault position is a non-necessary position, determining the abnormal protection strategy of the target flight device is fault voice prompt;

when the current fault degree is mild fault, and the current fault position is a necessary position, determining the abnormal protection strategy of the target flight device is maintenance fault part;

when the current fault degree is severe fault, and the current fault position is the necessary position, determining the abnormal protection strategy of the target flight device is closing the fault part.

6. The method according to claim 1, wherein a configuration mode of the vibration sensor comprises one of the following: a) integrated on the motor control system, and b) integrated on the steering engine control system.

7. A non-transitory computer readable storage medium, wherein the computer readable storage medium is stored with computer instructions, wherein the computer instructions cause the processor to perform the data monitoring method according to claim 1.

8. A non-transitory computer readable storage medium, wherein the computer readable storage medium is stored with computer instructions, wherein the computer instructions cause the processor to perform the data monitoring method according to claim 2.

9. A non-transitory computer readable storage medium, wherein the computer readable storage medium is stored with computer instructions, wherein the computer instructions cause the processor to perform the data monitoring method according to claim 3.

10. A non-transitory computer readable storage medium, wherein the computer readable storage medium is stored with computer instructions, wherein the computer instructions cause the processor to perform the data monitoring method according to claim 4.

11. A non-transitory computer readable storage medium, wherein the computer readable storage medium is stored with computer instructions, wherein the computer instructions cause the processor to perform the data monitoring method according to claim 5.

12. A non-transitory computer readable storage medium, wherein the computer readable storage medium is stored with computer instructions, wherein the computer instructions cause the processor to perform the data monitoring method according to claim 6.

* * * * *